May 11, 1943.  J. H. McGILL  2,319,074
MANUFACTURE OF LEATHER CLOTH AND SIMILAR COATED FABRICS
Filed Aug. 5, 1941
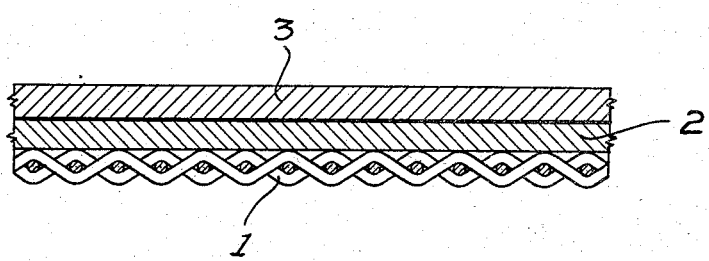
INVENTOR.
John Heron McGill
BY Frank C. Hilberg
ATTORNEY Patented May 11, 1943

2,319,074

UNITED STATES PATENT OFFICE 2,319,074

MANUFACTURE OF LEATHER CLOTH AND SIMILAR COATED FABRICS

John Heron McGill, Debdale Park, Manchester, England, assignor to Imperial Chemical Industries Limited, a corporation of Great Britain Application August 5, 1941, Serial No. 405,548
In Great Britain August 12, 1940.

7 Claims. (Cl. 117—73)

The present invention relates to the manufacture of leathercloth and similar coated fabrics.

The name polythene has been given to certain valuable materials of a paste-like to solid consistency shewing crystalline structure when examined by X-ray diffraction analysis, which are obtained by heating ethylene under a pressure of not less than about 500 atmospheres, if desired in the presence of a minute amount of oxygen. Polythenes have molecular weights as measured by the Staudinger solution viscosity method ranging from 2,000 to 30,000 or more. In the claims the term polythene has this meaning. British specification 481,515 discloses methods whereby polythene may be halogenated and states that the products can be employed for coating or impregnating materials such as paper or fabric.

In the present invention there are employed halogenated derivatives of those polythenes that are solid at ordinary atmospheric temperatures and do not melt or soften appreciably at temperatures below 100° C., referred to hereinafter as solid polythenes. The properties of halogenated solid polythenes vary according to their halogen content, for example in the case of chlorinated polythenes those containing 15 to 30% chlorine are soft and rubbery, those containing 30 to 40% chlorine are soft and tacky, those containing 40 to 55% chlorine are tough and those containing more than 55% chlorine are hard and glassy.

Films, coatings and the like made from halogenated solid polythenes have many valuable properties such as low inflammability and a high capacity for repeated flexure, but their resistance to scratching and to the effect of light is less than that of films, coatings and the like made from nitrocellulose; and their light stability, unlike that of similar products obtained from nitrocellulose, is not very materially improved by the inclusion of pigments.

I have found that while nitrocellulose coatings do not adhere to halogenated solid polythenes we can produce leathercloth and similar coated fabrics combining many valuable properties of nitrocellulose coated fabrics and halogenated solid polythene coated fabrics, by applying to a textile or other fabric coated with a composition based on halogenated solid polythenes one or more cementing coats comprising a resin compatible with the halogenated polythene and with nitrocellulose, and thereafter applying one or more coats of pigmented nitrocellulose composition, if desired containing a non-solvent plasticiser.

In putting the invention into effect there may be employed as the resin in the cementing layer one or more polymerised acrylic acid esters or methacrylic acid esters or an interpolymer thereof. Polyvinyl esters of organic acids may also be employed. Softening agents for the resin may be included in the cementing layer, which may conveniently be applied in the form of a solution in a solvent for the resin or in the form of an aqueous emulsion. Examples of suitable resins for the cementing layer include polymerised methyl acrylate, polymerised 2-ethylhexyl methacrylate, polymerised ethoxy-ethylmethacrylate, polymerised methyl methacrylate, polyvinylphthalate, and an emulsion polymerised mixture of methyl-methacrylate and 2-ethyl hexyl methacrylate.

As the extent of protection given to the halogenated polythene coat is dependent on the opacity of the pigmented nitrocellulose coat and the strength and the adhesion of the nitrocellulose coat is adversely affected by a large proportion of pigment it is advisable to use a pigment of the highest opacity possible particularly as we have found that the adhesion of the two coats is not satisfactory if a thicker coat of nitrocellulose than one given by spreading 2 oz. per square yard is used.

As the halogen content of the halogenated solid polythenes is increased the tendency is for the strength of the resulting coatings as indicated by the scrub test to increase, but also for their thermoplasticity to increase, which may give rise to certain difficulties if leathercloth made from highly chlorinated solid polythenes is to be embossed. For this reason it is often very advantageous to employ a mixture of halogenated solid polythenes of differing halogen content obtained by chlorinating the polythene to differing degrees of chlorination.

The halogenated solid polythene layer may be pigmented, for instance, if it is desired to obscure the texture of the base fabric, for which purpose from about one quarter to three times its own weight of opaque pigment may advantageously be employed.

The halogenated polythene layer may be conveniently applied to the base fabric in solution by spreading or the like and drying off between each coat. One or more coats of the cementing composition may then be applied and followed by one or more coats of the pigmented nitrocellulose composition applied in known manner.

If desired a final coating of unpigmented nitrocellulose lacquer may be applied. Other methods than spreading are, however, applicable for the application of the halogenated polythene layer; for instance the halogenated polythene composition may be calendered on to the base cloth.

The invention is illustrated in the accompanying drawing in which 1 represents the base fabric, 2 the coat of halogenated polythene, and 3 the pigmented nitrocellulose coat. The dark line separating layers 2 and 3 represents the thin cementing coat.

The invention is further illustrated by the following example in which the parts are parts by weight:

Example

According to this example a mixture of halogenated polythenes is used.

The halogenated polythenes are made by chlorination of a solid polythene, having a molecular weight between 12,000 and 15,000, in a carbon tetrachloride solution at 70° C. to 26% and 46% chlorine content respectively. The coating composition is made up as follows:

|  | Parts |
|---|---|
| Chlorinated polythene of 26% chlorine content | 1 |
| Chlorinated polythene of 46% chlorine content | 1 |
| Yellow ochre | 2 |
| Benzol | 2 |

Cotton sheeting having a reed and pick of 50/50 weighing 7 oz. to the square yard is coated by spreading with 4 oz. (dry weight) per square yard of the above composition in several successive spreads, each dried off before applying the next.

A single spread of the following solution is then applied over the halogenated polythene layer—

|  | Parts |
|---|---|
| Methyl methacrylate | 4 |
| Dibutyl phthalate | 3 |
| Solvent mixture of benzol and industrial alcohol in the ratio 80:20 by volume | 40 |

The nitrocellulose coating composition is made up as follows:

|  | Parts |
|---|---|
| Nitrocellulose | 2 |
| Castor oil | 4 |
| Zinc chromate | 4 |
| Solvent mixture of ethyl acetate and industrial alcohol in the ratio 40:60 by volume | 12 |

This is applied by spreading about 1–1½ oz. (dry weight) per square yard to the cementing layer as required in known manner to give satisfactory cover.

The resulting coated fabric has a greater strength, as shewn by the scrub test than would be obtained from a fabric coated with a similar number of coats of similar weight based on nitrocellulose. On the other hand it has greater stability to ultraviolet light and a greater scratch hardness than a fabric coated with a similar number of coats of similar weight based on halogenated polythene. It may be embossed by the normal method used in the nitrocellulose leathercloth industry. The cotton sheeting used may be dyed to match the shade of the leathercloth pattern.

As many seemingly widely different embodiments of the invention will be apparent without departing from the spirit and scope thereof, it must be understood that the invention is not limited except as defined in the appended claims.

I claim:

1. A method of manufacturing coated fabrics which comprises applying to a fabric coated with a composition comprising halogenated solid polythenes at least one cementing coat comprising a resin compatible both with halogenated polythenes and with nitrocellulose, and thereafter applying at least coat of pigmented nitrocellulose composition.

2. A method as claimed in claim 1 in which the cementing coat comprises a polymer of at least one ester of an acid of the formula

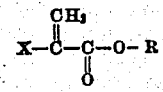

in which X is a radical of the group which consists of CH₃ and H and R is a radical of the group which consists of alkyl and alkoxy alkyl radicals.

3. A method as claimed in claim 1 in which the cementing coat comprises a polymerised vinyl ester of an organic acid.

4. A method as claimed in claim 1 in which the cementing coat comprises a polymeric ester of methacrylic acid.

5. A method as claimed in claim 1 in which the cementing coat comprises an emulsion polymerised mixture of methyl methacrylate and 2-ethyl hexyl methacrylate.

6. A method as claimed in claim 1 in which the cementing coat comprises polymerised methyl acrylate.

7. A method as claimed in claim 1 in which the halogenated polythene coat comprising a mixture of halogenated polythenes of different halogen content.

JOHN HERON McGILL.